Aug. 5, 1941.                L. M. FROST                 2,251,733
                           CLAMPING WASHER
                         Filed April 9, 1940
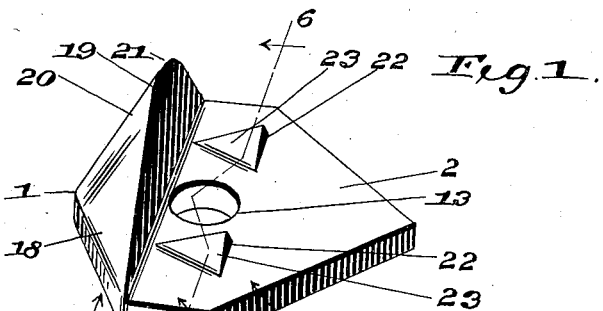
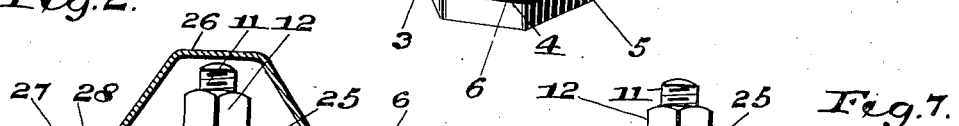
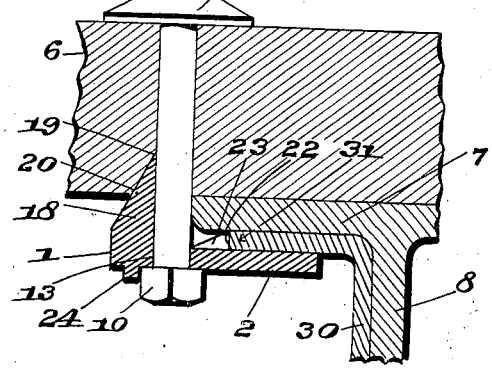
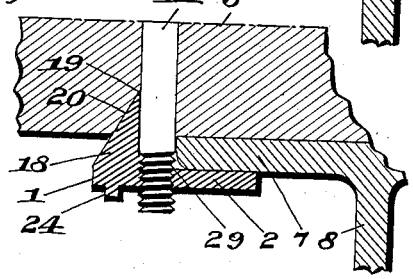
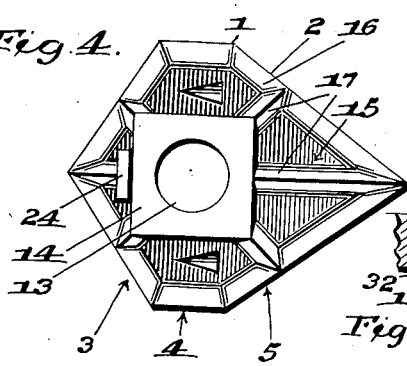
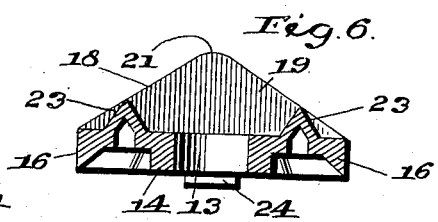
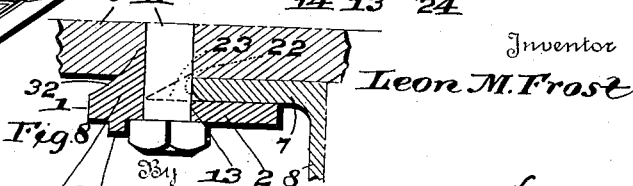
Inventor
Leon M. Frost Patented Aug. 5, 1941

2,251,733

UNITED STATES PATENT OFFICE 2,251,733

CLAMPING WASHER

Leon M. Frost, Battle Creek, Mich.

Application April 9, 1940, Serial No. 328,790

6 Claims. (Cl. 189—35)

This invention relates to improvements in clamping washers, its particular purpose being to secure railway and other bridge ties to the girders of a bridge. This use is stated mainly for the purpose of setting out a specific example, but it will be readily apparent that the washer may be employed for clamping any analogous but totally dissimilar parts together.

Reverting to the example of securing railway ties to bridge girders, the problem arises as to how to do the securing in the most effective manner. It is not desirable to drill the flanges of the girders because of the likelihood of eventual breakage due to a crack starting at the drilled hole. The alternative is to adopt some means of anchorage of the heads of the bolts to the girder flanges other than by drilling. But all means of this type have the fault of allowing some slippage of the parts which are supposed to be secured, to the ultimate end of a loosening of the ties. With this premise in mind the objects of the invention are as follow:

First to provide a contrivance for securing railway ties to bridge girders without drilling any part of the girders and thereby weakening them.

Second, to provide a washer which is interposed between the head of the securing bolt and the flange of a girder to which a tie is to be secured, said washer having a wedge portion in engagement with the tie, serving to keep the washer level so that the full clamping effect of the bolt can be transmitted through the washer to the flange without any possibility whatsoever of the washer eventually riding out of position.

Third, to provide a clamping washer of the general character stated, which is supplemented by a haunch which is adapted to be driven into the tie with a wedge action, serving to keep the washer level and positively prevent its swinging out of clamping relationship to the flange of the girder regardless of how hard the nut of the securing bolt is driven home.

Fourth, to provide a clamping device which is supplemented by a protective hood which is superimposed upon the exposed end of the bolt preventing dirt and moisture from getting at the bolt.

Other objects and advantages will appear in the following specification, reference being had to the accompanying drawing, in which:

Figure 1 is a perspective view of the clamping washer.

Figure 2 is a cross section illustrating the use of the clamping washer as an anchorage for the bolt that secures a tie to the flange of a girder, this view also illustrating the protective hood.

Figure 3 is a detail sectional view illustrating how the hole of the washer may be threaded for the securing in of the securing bolt.

Figure 4 is an inverted plan view of the washer in Fig. 1.

Figure 5 is an elevation of the washer particularly illustrating the haunch.

Figure 6 is a cross section taken on the line 6—6 of Fig. 1.

Figure 7 is a detail sectional view partially in elevation illustrating the use of a modified form of the improved washer in conjunction with a built-up or reinforced girder.

Figure 8 is a detail sectional view illustrating a slightly modified form of haunch.

In carrying out the invention provision is made of a clamping washer generally designated 1 in each of the several forms of the invention (Figs. 2, 7 and 8). Said washer comprises a plate 2 which may be of a shape other than shown in Figs. 1 and 4, but preferably is of the specific shape disclosed because it thus lends itself to the definite demarkation of the portions 3, 4 and 5 which play an important part in the use of the device.

As seen in Fig. 2, the washer 1 is used in conjunction with a railway tie 6 or equivalent part which is intended to be secured to the flange 7 of a girder 8. The tie 6 is laid upon the girder and it is the resulting offset at 9 which presents the problem of employing a washer under the head 10 of the bolt 11 and enabling the screwing home of the nut 12 without lessening or diverting the clamping pressure against the washer and in turn against the flange 7 in the least. It is the washer portion 4 which is provided with a hole 13 (smooth in the instance of Fig. 2) for occupancy by the bolt 11. The head 10 has bearing on the nether side of the portion 4, as is clearly to be seen in Fig. 2.

But this portion, especially the part with which the head 10 makes actual contact, is given the form of a rectangular or similar base 14 (Fig. 4). This base is delineated as seen in Fig. 4, because the washer plate is largely hollow in a sense. It could be a solid piece of metal, but it is preferred to core the portions 3, 4 and 5 out as commonly designated 15, thus to lessen the amount of metal used in the washer. The perimeter of the washer plate is of cross sectional wedge form as at 16 (Fig. 6). The core spaces are bridged by V-formed ribs 17 which radiate from the base 14 and merge into the perimeter 16. The washer plate thus has adequate strength.

In pressing upward against the mid portion 4, the bolt head 10 clamps the plate portion 2 against the flange 7. Continued tightening of the nut 12 tends to cause the washer to follow the pressure line a because the pull of the bolt is across the offset 9 and the bearing of the plate portion 2 against the flange 7 obviously is one-sided.

It is here where the value of the invention will be apparent. The plate portion 3 is equipped with a haunch 18 which bites deeply into the tie 6 and forms an anchorage which positively prevents the washer from yielding to the foregoing tendency to turn on the pressure line a. By having the haunch bite into the timber the pressure which would circle around the point b in case the bolt started to bend, is withstood in the region c without being transmitted through the haunch to the bolt.

The result is that the clamping washer 1 remains perfectly level. Or, perhaps more accurately stated, it remains normal to the flange 7 with which it makes clamping contact. The haunch 18 is characteristically wedge-formed. It has an erect wall 19 which merges with one side of the hole 13 or nearly so. The haunch is pyramidal in shape, the surface 20 opposite to the wall 19 sloping away in all directions from the crest 21 until it meets the configuration of the portion 3, thus defining a perimetric cutting edge for the penetration of the wood.

Thus it is readily seen that screwing the nut home results in driving the wedge or haunch 18 into the wood, and since the haunch is ever increasing in size downwardly from the crest 21, it follows that the haunch will soon become jammed in a position from which it cannot be driven any farther. The clamping washer is kept from turning in reference to the girder flange 7 by the engagement of the upright walls 22 of a pair of lugs 23 with the edge of the girder flange.

These lugs project up from the washer plate 2 (Fig. 1) and are disposed on opposite sides of the hole 13 in the plate portion 4. In addition to preventing the plate from turning they also space the haunch 18 the requisite distance from the girder flange so that there will be ample room for the free insertion of the bolt 11 in the first instance. A short lug 24 on the nether side of the washer plate (Fig. 2) and immediately beside the base 14 is adapted to be abutted by one of the side faces of the head 10 to prevent the bolt from turning while the nut is being screwed home.

A washer 25 is generally used beneath the nut, although this has nothing to do with the invention. Considerable importance is attached to the use of a hood 26 in conjunction with the upper exposed end of the bolt. Usually this end carries the threads and from experience it has been found that due to the accumulation of dirt and corrosion which follows subjection to moisture, it is often difficult, if not impossible, to remove the nut. By using the hood 26, the upper exposed end of the bolt is sealed in and it becomes possible to grease the threads and yet not run the chance of the nut screwing loose. The hood is flanged at 27 and nails 28 or their equivalents are driven through into the tie 6.

In Fig. 3 the hole previously designated 13 is threaded at 29. In this instance the bolt, again designated 11, is screwed into the hole. The head 10 (not shown in Fig. 3) is then on top. This arrangement is useful for some purposes and is varied at will from the modification in Fig. 2.

Figure 7 illustrates the use of a reinforcement 30 in conjunction with the girder 7, 8. This reinforcement is shown as being in the nature of an angle iron. It produces an additional offset at 31. The washer plate 2 will be made somewhat larger to suit a use such as this, but whether it is made larger or not the main change in its construction lies in the repositioning of the lugs 23. These are now situated in the plate portion 5 so that the upright walls 22 can abut the edge of the reinforcement 30. By properly proportioning the reinforcement it is easily possible to accurately set the clamping washer 1 so that the bolt 11 will not bind against the edge of the flange 7 to an objectionable degree.

Figure 8 is identical with Fig. 2, the only exception being that the haunch 18 is made concave at 32 on the outer surface previously designated 20. In most instances the surface 20 will be perfectly level as in Figs. 2, 3 and 7, but it is conceivable that the concave formation may serve a good purpose for some installations, and for that reason the modification in Fig. 8 is disclosed herein.

By an extension of the principle thus amplified, it is desired to state that the haunch 18 can be made of different heights. The character of the wood in the tie 6 would determine the height. A height greater than suggested in Fig. 2 would insure a deeper penetration yet exceptionally hard wood would tend to resist a deep penetration. Under such a circumstance the haunch could be made of less height.

In conclusion it is desired to point out that the coring of the nether side of the plate 2 extends into the lugs 23. These lugs are thus capable of deformation. Ordinarily they will penetrate the timber in the event that the girder flange 7 is rather thin but in case of their coming in contact with a metal surface instead of a wooden timber they will flatten against the metal and thus conform to the surface thereof.

I claim:

1. For use on a girder flange and superimposed timber, a clamping washer comprising a washer plate having a hole for a bolt driven through the timber to secure said plate, a portion of said plate at one side of the hole being engageable with the flange, another portion of said plate extending free beyond the margin of the flange, means on said free portion of the plate being of a height in excess of the thickness of the flange thereby to penetrate the timber and anchor said plate from turning, and means on said plate to space the hole clear of the flange edge, also being adapted to penetrate the timber in the event of the flange being of less thickness than the height of said last means.

2. A clamping washer comprising a washer plate having a bolt hole in the substantial middle thereof, upstanding lugs alined transversely of said hole, and a generally pyramidal haunch upstanding from a portion of the plate contiguous to said lugs, said haunch constituting a timber penetrating wedge.

3. A clamping washer comprising an essentially flat-surfaced washer plate having a bolt hole in the substantial middle thereof, lugs upstanding from the flat surface and alined transversely of said hole, and a haunch also upstanding from the plate contiguous to said lugs, having an inner wall perpendicular to said flat surface and a sloping outer wall defining a perimetric cutting edge for the penetration of a substance such as wood.

4. A clamping washer comprising an essentially flat-surfaced washer plate having a bolt hole in the substantial middle thereof, lugs upstanding from the flat surface and alined transversely of said hole, and a haunch also upstanding from the flat surface of the plate contiguous to said lugs, having an inner wall perpendicular to said flat surface and an outer sloping wall of concave contour merging with the perpendicular wall to define a perimetric cutting edge for the penetration of a substance such as wood.

5. A clamping washer comprising a washer plate having a medially situated base with a bolt hole, said plate being cored on one side to define a plurality of ribs radiating from said base, said coring defining a wedge-shaped perimeter for the plate, a lug at one side of the base on one side of the plate, plural cored lugs on the other side of the plate in line with the hole, and an upstanding haunch contiguous to the hole having an upright wall substantially merging with the hole.

6. A clamping washer comprising a washer plate having a bolt hole, a wood-penetrable haunch of wedge shape upstanding from one side of the plate and including an inner wall traversing the plate substantially flush with one side of the hole, and a pair of wood-penetrable lugs also of wedge shape and upstanding from the same side of the plate, being distributed on each side of the hole on a line parallel to the haunch wall.

LEON M. FROST.